Sept. 16, 1947.  T. J. HOY  2,427,456
JOINT
Filed Feb. 12, 1944
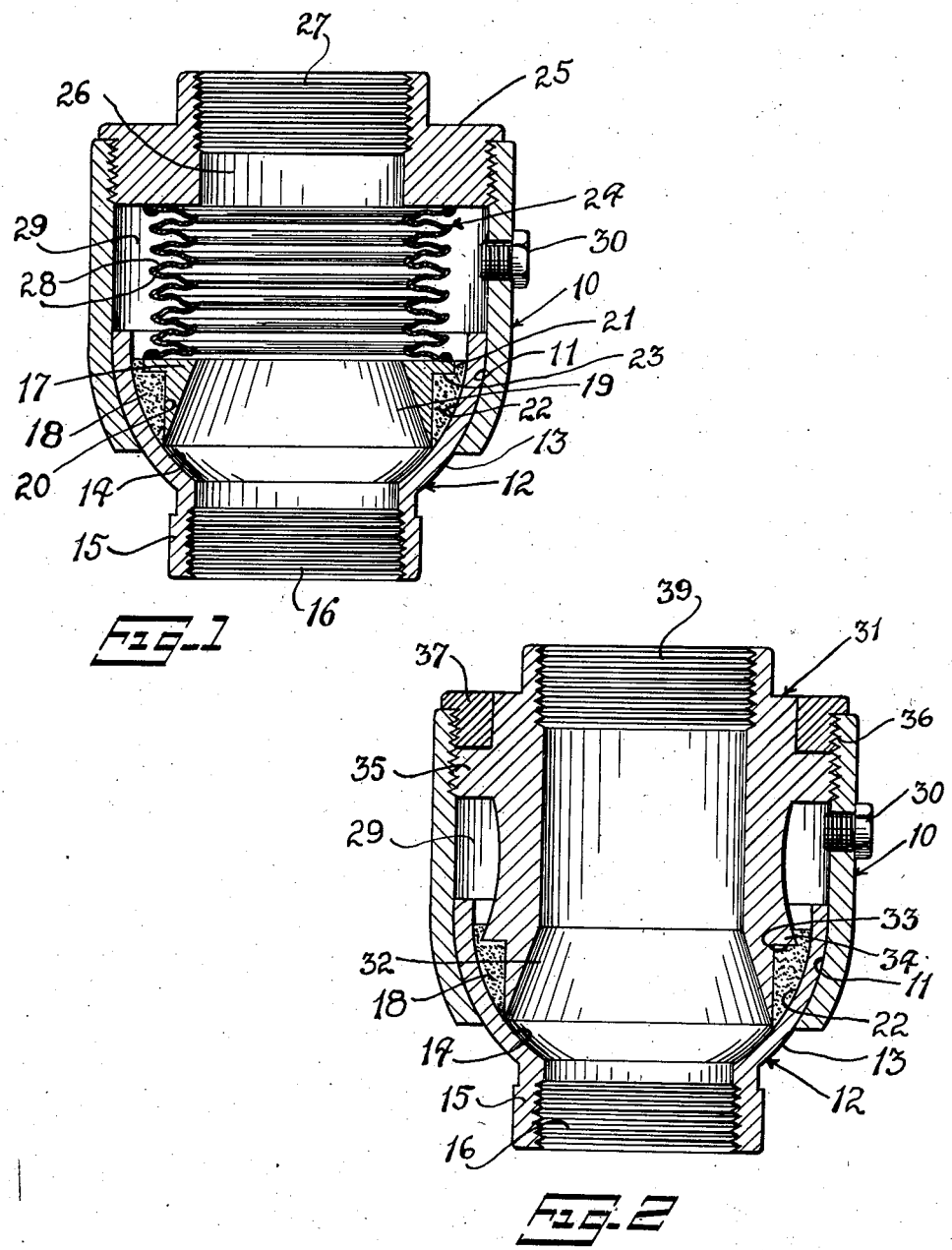
INVENTOR.
THOMAS J. HOY.
BY E. Francis Wentworth Jr.
ATTORNEY Patented Sept. 16, 1947

2,427,456

UNITED STATES PATENT OFFICE 2,427,456

JOINT

Thomas J. Hoy, Newark, N. J.

Application February 12, 1944, Serial No. 522,043

2 Claims. (Cl. 285—91)

This invention relates to joints and more particularly to flexible joints for use between members which move in relation to one another.

Joints of the character of the present invention are generally used for joining two conduits for conducting fluid which conduits have movement in relationship to each other. It is essential that the joint be flexible to permit movement of the conduits and at the same time be fluid-tight. The present invention provides a fluid-tight flexible joint.

The invention will be understood from the following description when considered in connection with the accompanying drawing forming a part thereof and in which:

Fig. 1 is a vertical sectional view of a joint of the present invention, and

Fig. 2 is a view similar to Fig. 1 but of another form of the invention.

Like characters of reference refer to like parts throughout the views.

Referring to the form of the invention shown in Fig. 1 of the drawing, the reference numeral 10 designates a tubular socket member having a curved surface 11 forming a socket at one end thereof. A hollow, substantially hemispherical-shaped member 12 is adapted to be received in the socket member and has a curved outer surface 13 and a curved inner surface 14. The curved outer surface 13 is of substantially the same radius as the surface 11 and is adapted to slidably engage the surface 11. The member 12 has a tubular extension 15 screw-threaded at 16 in the inner surface thereof to receive one end of a conduit, not shown.

The surface 13 of the member 12 is held in tight, slidable engagement with the surface 11 of the socket member 10 by means of a retaining ring 17 which bears against a sealing gasket 18 which, as shown, is of resilient material but which may be of metal, if desired. The gasket 18 is positioned between the retaining ring 17 and the surface 14. The inner periphery 19 of the retaining ring, as shown, is substantially frustro-conical shaped while the outer periphery 20 is substantially annular shaped and has an annular extension 21. The outer periphery 22 of the gasket 18 is curved at substantially the same radius as the inner surface 14 of the member 12 so that the periphery 22 will engage the surface 14. The gasket 18 is recessed at 23 to receive the extension 21. A tubular shaped resilient sealing member 24 of a diameter less than the inside diameter of the member 12, bears at one end thereof against the extension 21 of the ring 17. The opposite end of the sealing member is engaged by an end cap 25 which is screwed into the end of the socket member 10 opposite the end adapted to contain the member 12, the screw-threads on the outer periphery of the cap engaging the screw-threads on the inner periphery of the socket member. The cap has a cylindrical bore 26 therethrough which bore is of substantially the same diameter as the inside diameter of the sealing member 24 and extension 15. The bore is screw-threaded at 27 to receive a conduit, not shown. The sealing member 24, as shown, comprises a resilient metallic bellows having a plurality of annular leaves 28 of resilient material which leaves are superimposed in spaced relationship to one another and are, as shown, reversely bent transversely thereof, each leaf being connected in fluid-tight relationship adjacent the opposite edges thereof to the leaf adjacent the opposite sides thereof. The sealing member 24 is preferably welded at one end thereof in fluid-tight relationship to the cap 25 and welded at the other end thereof to the ring 17 in fluid-tight relationship. Since the sealing member 24 is of lesser diameter than the inside diameter of the socket member 10, a lubricating chamber 29 is formed. A lubricant is admitted to the chamber 29 through an aperture normally closed by the plug 30.

With the joint of the form of the invention shown in Fig. 1, when the cap 25 is screwed into position in the socket member 10, the resilient sealing member 24 is placed under tension which exerts a pressure on the retaining ring 17. Pressure on the retaining ring 17 causes the ring to force the outer periphery 22 into tight but slidable engagement with the inner surface 14 of the member 12. Pressure on the retaining ring 17 and sealing gasket 18 will force the outer surface 13 of the member 12 into tight but slidable engagement with the inner surface 11 of the socket member 10. The sealing gasket 18 receives lubricant from the chamber 29 as do the surfaces 11 and 13. A fluid-tight, flexible joint in which the contacting surfaces of the joint are lubricated is, therefore, provided. This invention also provides a joint in which equal pressure is exerted throughout substantially the entire area of the contacting surfaces. Fluid will not leak from the joint since the sealing gasket is held in tight engagement with the inner surface of the member 12 and the outer surface of the member 12 is held in tight engagement with the inner surface 11 of the socket member by the resilient sealing member 24 which is under tension. An increase in pressure of the fluid passing through the joint will cause the tension of the sealing member to increase since the increased pressure will cause the bellows to tend to expand thereby increasing the pressure exerted on the retaining ring 17 which in turn increases the pressure on the sealing gasket 18 and the member 12 thereby tightening the joint.

In the form of the invention shown in Fig. 2, the sealing gasket 18 is held in engagement with the surface 14 of the member 12 and the surface 13 of the member 12 is held in engagement with the surface 11 of the socket member 10 by means of a tubular retaining member 31, the outside diameter of which is less than the inside diameter of the socket member 10 or the inside diameter of the member 12. The inner periphery of the end of the retaining member adjacent the gasket 18 is substantially frustro-conical shaped, as shown at 32, the outer periphery of said end being reduced in diameter to form a recess 33 which receives a substantial part of the gasket 18, the gasket being recessed to receive an annular projection 34 on the member 31 adjacent the recess 33. The member 31 has an annular extension 35 axially spaced from the recessed end of said member so that a top to the lubricating chamber 29 is formed. The extension 35 is screw-threaded to engage the screw-threads 36 in the inner periphery of the member 10. A lock-nut 37 is also adapted to engage screw-threads 36 in the member 10 so that the member 31 may be locked in position. The member 31 is screw-threaded at 39 to receive a conduit, not shown.

In the form of the invention shown in Fig. 2, the periphery 22 of the sealing gasket 18 is held in tight, slidable relationship with the surface 14 of the member 12, and the surface 13 of the member 12 is held in tight slidable relationship with the surface 11 of the member 10 by turning the member 31 so that the screw-threads in the extension 35 engage the screw-threads 36 to thereby move the member 31 toward the sealing gasket 18. The member 31 is turned until the extension 34 on the member 31 presses the periphery 22 of the sealing gasket 18 into tight slidable engagement with the surface 14 of the member 12 which in turn will press the surface 13 of the member 12 into tight, slidable engagement with the surface 11 of the socket member 10. The tightness of the engagement between said surfaces can be adjusted by turning the member 31, and the member is locked in the desired position by the lock nut 37. As in the form of the invention shown in Fig. 1, the sealing gasket 18 and the surfaces 11 and 13 are lubricated from the chamber 29. An equal pressure is exerted on the contacting surface of the joint of this form of the invention throughout substantially the entire area of the contacting surfaces by the member 31.

Since changes may be effected in the forms of the invention selected for disclosure without departing from the principles of the invention, it will be understood that the invention is not to be limited except by the scope of the appended claims.

What is claimed is:

1. A flexible joint comprising a tubular casing with a concave inner surface adjacent one end thereof forming a socket, said socket having an opening therethrough, a substantially semi-spherical ball member having a substantially annular concave inner surface and an outer surface adapted to fit into and slidably engage the concave inner surface of the casing, passage forming means adapted to be connected at one end to a conduit, said passage forming means being secured in a fluid-tight manner to the casing and extending into and terminating at the opposite end thereof in said ball member, a portion at least of the passage forming means comprising tubular bellows adapted to expand and contract axially of the casing, said bellows being normally preloaded to exert a pressure axially thereof, a gasket engaging in a fluid-tight manner the inner surface of the ball member and the outer surface of the portion of the passage forming means extending into said ball member, and means by which a conduit is secured to the ball member to communicate with the passage forming means at the end terminating in the ball, the arrangement being such that a sealing engagement is maintained between the gasket, said outer surface of the passage forming means and the inner surface of the ball member so that said passage forming means forms a continuous fluid-tight passage between said conduits.

2. A flexible joint comprising a tubular casing with a concave inner surface adjacent one end thereof forming a socket, said socket having an opening therethrough, a substantially semi-spherical ball member having a substantially annular concave inner surface and an outer surface adapted to fit into and slidably engage the concave inner surface of the casing, passage forming means adapted to be connected at one end to a conduit, said passage forming means being secured in a fluid-tight manner to the casing and extending into and terminating at the opposite end thereof in said ball member, a portion at least of the passage forming means comprising tubular bellows adapted to expand and contract axially of the casing said bellows being normally preloaded to exert a pressure axially thereof, the bellows being of lesser diameter than the inner diameter of the casing to form a lubricating chamber therein, a gasket engaging in a fluid-tight manner the inner surface of the ball member and the outer surface of the portion of the passage forming means extending into said ball member, and means by which a conduit is secured to the ball member to communicate with the passage forming means at the end terminating in the ball, the arrangement being such that a sealing engagement is maintained between the gasket, said outer surface of the passage forming means and the inner surface of the ball member so that said passage forming means forms a continuous fluid-tight passage between said conduits.

THOMAS J. HOY.

REFERENCES CITED

The following references are of record in the file of this patent:

UNITED STATES PATENTS

| Number | Name | Date |
| --- | --- | --- |
| 1,018,143 | Vissering | Feb. 20, 1912 |
| 1,702,066 | Valentine | Feb. 12, 1929 |
| 439,022 | Martin | Oct. 21, 1890 |

FOREIGN PATENTS

| Number | Country | Date |
| --- | --- | --- |
| 94,537 | Germany | Jan. 3, 1897 |